(12) United States Patent
Vassar et al.

(10) Patent No.: US 9,037,962 B1
(45) Date of Patent: May 19, 2015

(54) METHOD AND SYSTEM FOR TRACKING AND REPORTING DATA IMPORTATION ACCURACY

(75) Inventors: Sara Vassar, The Colony, TX (US); Thomas R. Palfreyman, Flower Mound, TX (US); Gurmeet Singh, Irving, TX (US)

(73) Assignee: Intuit Inc., Mountain View, CA (US)

(*) Notice: Subject to any disclaimer, the term of this patent is extended or adjusted under 35 U.S.C. 154(b) by 528 days.

(21) Appl. No.: 13/459,492

(22) Filed: Apr. 30, 2012

(51) Int. Cl.
*G06F 17/00* (2006.01)
*G06F 17/24* (2006.01)

(52) U.S. Cl.
CPC .................................. *G06F 17/243* (2013.01)

(58) Field of Classification Search
CPC .................................................. G06F 17/243
USPC .................... 715/200, 255, 224, 225, 226
See application file for complete search history.

(56) References Cited

U.S. PATENT DOCUMENTS

| | | | | |
|---|---|---|---|---|
| 6,996,571 B2* | 2/2006 | McConnell | ......................... | 1/1 |
| 7,343,551 B1* | 3/2008 | Bourdev | ....................... | 715/224 |
| 7,500,178 B1* | 3/2009 | O'Donnell | ..................... | 715/221 |
| 7,747,940 B2* | 6/2010 | Qa'Im-maqami | ............. | 715/222 |
| 7,774,284 B2* | 8/2010 | Williams et al. | .............. | 705/300 |
| 7,774,694 B2* | 8/2010 | Watson et al. | ................. | 715/224 |
| 7,779,345 B2* | 8/2010 | Topalov et al. | ................. | 715/224 |
| 7,818,175 B2* | 10/2010 | Carus et al. | ..................... | 704/270 |
| 7,849,398 B2* | 12/2010 | Dabet et al. | ..................... | 715/226 |
| 8,407,113 B1* | 3/2013 | Eftekhari et al. | ................ | 705/31 |
| 8,418,920 B2* | 4/2013 | Lieberman et al. | ........... | 235/383 |
| 8,452,676 B1* | 5/2013 | Talan et al. | ...................... | 705/31 |
| 8,606,665 B1* | 12/2013 | Shaw | ............................. | 705/31 |
| 8,650,474 B2* | 2/2014 | Scoda | ............................ | 715/224 |
| 8,707,157 B1* | 4/2014 | Chouhan | ........................ | 715/222 |
| 2002/0040309 A1* | 4/2002 | Powers et al. | ..................... | 705/7 |
| 2002/0111888 A1* | 8/2002 | Stanley et al. | ................... | 705/31 |
| 2009/0326995 A1* | 12/2009 | Sorisi et al. | ........................ | 705/7 |
| 2010/0287084 A1* | 11/2010 | Roberts et al. | ................... | 705/35 |
| 2014/0109200 A1* | 4/2014 | Tootill et al. | ..................... | 726/5 |
| 2015/0038178 A1* | 2/2015 | Chin et al. | .................... | 455/457 |
| 2015/0046318 A1* | 2/2015 | Shillig | ............................ | 705/38 |

* cited by examiner

*Primary Examiner* — Cong-Lac Huynh
(74) *Attorney, Agent, or Firm* — Hawley Troxell Ennis & Hawley LLP; Philip McKay (57) ABSTRACT

Import data is obtained from one or more source documents and used to generate proposed pre-import review data indicating the proposed use of the import data to auto-fill one or more data entry fields in one or more forms associated with a data management system. The proposed pre-import review data is provided to a user for review, editing, and correction, and any changes to the data entry fields in the proposed pre-import review data are recorded. The proposed pre-import review data and data indicating the user's edits, corrections, or changes to the proposed pre-import review data, are analyzed/compared to calculate an accuracy score for the proposed pre-import review data and one or more reports are generated and provided to the user indicating the accuracy score for the proposed pre-import review data.

29 Claims, 2 Drawing Sheets

METHOD AND SYSTEM FOR TRACKING AND REPORTING DATA IMPORTATION ACCURACY

BACKGROUND

Over the past decade numerous data management systems have enjoyed increasing popularity and use throughout the world. Some examples of data management systems currently available include, but are not limited to, business and personal tax preparation systems, financial management systems, personal and business accounting systems, personal and business record keeping and inventory systems, healthcare expense management systems, receipt management systems, and numerous other applications/systems that help a user organize, process, import, and use, various types of data from various sources of data.

One important function provided by, or associated with, many data management systems is the ability to obtain/convert source data from source documents, and/or source document data, into data that can be imported to, and/or processed by, the data management systems. This importation process typically involves using Optical Character Recognition (OCR), or similar systems, to identify relevant source data from various source documents and convert the source data into import data that is then used to auto-fill appropriate data entry fields in one of more digital forms used with the data management system.

As a specific illustrative example, when the data management system is tax preparation system, a tax preparer, or other tax professional, who desires to prepare one or more tax related forms for a client typically obtains one or more source documents, or image data representing the one or more source documents, from the client, e.g., W-2 forms, 1099-B forms, interest or dividend documents, mortgage payment documents, etc.

In this specific illustrative example, the one or more source documents are then processed using an OCR system, or similar functionality, to identify and extract various import data, such as income, interest paid amounts, dividend amounts, mortgage interest paid, etc., from the one or more source documents. In this specific example, the import data is data that will be needed to prepare and process one or more tax forms for the client. In this specific illustrative example, the import data is processed by the tax preparation system and/or used by the tax preparation system to auto-fill various fields of one or more tax forms for the client.

While the source data identification and importation process discussed above provides data management system users a powerful and time-saving tool, scanning, OCR, data entry field mapping, and other procedures associated with the data importation process are still imperfect. As a result, data management system users are often required to monitor and review the data importation process and, in many cases, the data management system users must make various corrections to the imported data and/or data entry fields auto-filled with the import data. This review/editing/correction process is often viewed quite unfavorably by data management system users and, as in many instances in life, the data management system users tend to focus on the errors generated rather than on the amount of data that was correctly imported.

While it is often human nature to focus on mistakes, particularly when the observer is the party who must correct the mistakes, this focus is particularly problematic for providers of data management systems. This is because the most frequent complaint regarding many data management systems, and the often cited reason for discontinuing the use of data management systems, is the perception that the data importation process is inaccurate and produces an unacceptable number of errors. In some cases, data management system users are even left with the impression that the time required to correct data importation errors completely offsets the time saved by using the data management system.

Despite the perception of many data management system users that an unacceptable number of errors are introduced by the importation process, typically only a very small percentage of errors are actually introduced by the data importation process. However, currently, users of data management systems are not provided any information indicating the actual percentage of errors introduced, or any indication of how well the data importation process really does work, other than having to focus on correcting the relatively few errors that are introduced. Clearly this current situation leaves the data management system users with a skewed impression of the efficiency of the data management systems and the value added.

What is needed is a method and system that provides a specific user of a data management system, and/or a provider of the data management system, an empirically-based indication of the accuracy of a given data importation event and how well the data management system is actually working for the specific user of the data management system.

SUMMARY

In accordance with one embodiment, a system and method for tracking and reporting data importation accuracy includes a process for tracking and reporting data importation accuracy whereby import data is obtained from one or more source documents, and/or from source document data, and the import data is used to generate proposed pre-import review data indicating the proposed use of the import data to auto-fill one or more data entry fields in one or more forms associated with a data management system.

In one embodiment, the proposed pre-import review data is provided to a user for review, editing, correction, and/or approval. In one embodiment, if the user makes any edits, corrections, or changes to the proposed pre-import review data, the user edits, corrections, or changes are recorded, e.g., any changes to the data entry fields in the proposed pre-import review data are recorded.

In one embodiment, the proposed pre-import review data and the data indicating the user's edits, corrections, or changes to the proposed pre-import review data, are analyzed/compared to calculate an accuracy score for the proposed pre-import review data, e.g., a percent of the auto-filled data fields in the proposed pre-import review data that were changed by the user is determined.

In one embodiment, the user corrected pre-import review data is then used as the import data for the data management system and one or more reports are generated and provided to the user indicating the accuracy score for the proposed pre-import review data.

Using the system and method for tracking and reporting data importation accuracy as disclosed herein, a specific user of a data management system, and/or a provider of the data management system, is provided an empirically-based indication of the accuracy of a given data importation event and how well the data management system is actually working for the specific user of the data management system. Consequently, using the system and method for tracking and reporting data importation accuracy as disclosed herein, a user of a data management system is given a more realistic, and unbiased, indication and perception of the accuracy and utility of the data management system and insight into the data importation process, thereby removing some of the mystery users currently experience with respect to data importation and data management system operation. In addition, the system and method for tracking and reporting data importation accuracy as disclosed herein provides data management system providers the opportunity to collect empirical performance data and feedback regarding the data management system.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for tracking and reporting data importation accuracy includes a process for tracking and reporting data importation accuracy.

In various embodiments, the process for tracking and reporting data importation accuracy is implemented as a feature of a data management system. In various embodiments, the process for tracking and reporting data importation accuracy is implemented as an add-on application or module. In various embodiments, the process for tracking and reporting data importation accuracy is implemented as a standalone application.

In various embodiments, all, or part, of the process for tracking and reporting data importation accuracy, and/or a data management system associated with the process for tracking and reporting data importation accuracy, is/are implemented on one or more computing systems and/or mobile computing systems, as discussed herein, and/or as known/available in the art at the time of filing, and/or as developed/made available after the time of filing.

In one embodiment, one or more source documents, and/or source document data, are obtained by the process for tracking and reporting data importation accuracy and/or one or more data management systems associated with the process for tracking and reporting data importation accuracy.

In various embodiments, the one or more source documents are hardcopy original source documents or copies of the source documents. In various embodiments, the source document data can include digital images of the original source documents or digital images of copies of the source documents.

In various embodiments, the type of source documents, and/or source document data, is dependent on the data management system importing the data and can include, but is not limited to: tax related documents such as W-2 forms, 1099-B forms, interest or dividend documents, mortgage payment documents, retirement plan related documents, etc.; financial documents such as invoices, checks, bills, bank statements, etc.; ownership documents such as deeds, pink slips, stock certificates, etc.; receipts; medical expense related documents, such a EOBs and healthcare service bills; and/or any other documents, copies of documents, or source document data, that include data or information that the user may desire to import into a data management system, as discussed herein, and/or as known in the art at the time of filing, and/or as developed/made available after the time of filing.

In one embodiment, the one or more source documents, and/or source document data, are obtained from a user who is the subject of the source documents, such as a tax payer or business owner.

In one embodiment, the one or more source documents, and/or source document data, are obtained from a user who is a representative, or agent, of the party who is the subject of the source documents, such as an accounting professional or a tax preparer whose client is the party who is the subject of the source documents.

In one embodiment, the user providing the one or more source documents, and/or source document data, is a user of a data management system associated with the process for tracking and reporting data importation accuracy.

Herein, the term data management system includes, but is not limited to, any on-line, and/or web-based, and/or computing system implemented, package, program, module, or application that processes a user's data and uses, includes, or has access to, a data importation capability. As a specific illustrative example, in one embodiment, the data management system associated with the process for tracking and reporting data importation accuracy is any on-line, and/or web-based, and/or computing system implemented, tax preparation system, package, program, module, or application. Specific examples of computing system implemented tax preparation systems include TurboTax™ or Lacerte™, available from Intuit Inc. of Mountain View, Calif.

In one embodiment, the one or more source documents, and/or source document data, obtained from the user are processed to identify and obtain import data to be used with, and/or processed by, the data management system.

In one embodiment, the one or more source documents, and/or source document data, obtained from the user are processed by an edge/boundary detection system and/or scanned using one or more Optical Character Recognition systems, and/or other pattern matching technology, to identify relevant data fields in the one or more source documents, and/or source document data, and/or relevant import data.

In one embodiment, the edge/boundary detection system detects individual data fields in the one or more source documents, and/or source document data.

In one embodiment, the one or more OCR systems, and/or pattern matching technology, are used to extract relevant information/images from the data fields of the one or more source documents, and/or source document data, and transform the information/images into electronic import data readable, and usable, by the data management system in the same way any other data is processed by the data management system.

In various embodiments, depending on the data management system involved, the import data can include, but is not limited to: tax related data, such as income, withholdings, 401K or other retirement contributions, dividend income data, interest earned data, interest paid data, etc.; financial data such as transactional data, invoice data, receipt data, expense data, etc.; healthcare expense data, such as EOB data, date of service data, deductible data, co-pay data, etc.; general user information such as Social Security/Tax payer ID number, Employer Identification Number (EIN), work address, home address, telephone number, marital status, etc.; and/or any other import data desired and/or as discussed herein, and/or as known in the art at the time of filing, and/or as developed/made available after the time of filing.

In one embodiment, once the import data is identified and extracted from the one or more source documents, and/or source document data, the import data is used to create a proposed pre-import review data file that indicates the proposed use of the import data to auto-fill one or more data fields in one or more forms associated with the data management system, and/or any other proposed use of the import data by the data management system.

In one embodiment, the one or more forms proposed to utilize the import data and the proposed data fields auto-filled with the import data in the proposed pre-import review data file are selected based on the data management system being used.

As a specific illustrative example, if the data management system being used is a tax preparation system, then the import data can be used to auto-fill various data fields in a tax questionnaire interface or in one or more tax forms such as a 1040 tax filing form. As another specific example, if the data management system being used is an accounting system, then the import data can be used to auto-fill various data fields of accounting report calculation forms/reports such as P&L reports or quarterly status reports. As another specific example, if the data management system being used is a financial management system, then the import data can be used to auto-fill various data fields of various financial status calculation forms/reports such as expense reports, categorized spending reports, savings reports, net worth reports, or projected expenses. As another specific example, if the data management system being used is a healthcare expense tracking system, then the import data can be used to auto-fill various data fields of forms/reports used to calculate total out-of pocket costs, projected costs, or the status of healthcare insurance payments.

In various embodiments, the import data can be used with numerous other forms and/or to prepare numerous other reports as dictated by the data management system being used. In addition, in various embodiments, the import data can be used by multiple different data management systems and data management system forms.

In one embodiment, once the proposed pre-import review data file that indicates the proposed use of the import data to auto-fill one or more data fields in one or more forms associated with the data management system, and/or any other proposed use of the import data by the data management system, is created, the proposed pre-import review data is provided to the user for review, editing, correction, and/or approval prior to the actual importation of the import data to the data management system.

In one embodiment, if the user makes any edits, corrections, or changes to the proposed pre-import review data, the user edits, corrections, or changes are recorded. In one embodiment, data indicating the user edits, corrections, or changes to proposed pre-import review data, and, in particular, the number and/or type of data entry fields edited or corrected, is recorded.

In one embodiment, the user edits, corrections, or changes to the proposed pre-import review data results in user corrected pre-import review data.

In one embodiment, the proposed pre-import review data and the data indicating the user edits, corrections, or changes to proposed pre-import review data are analyzed/compared to calculate an accuracy score for the proposed pre-import review data.

In one embodiment, the proposed pre-import review data and the user corrected pre-import review data are analyzed/compared to calculate an accuracy score for the proposed pre-import review data.

In one embodiment, the accuracy score for the proposed pre-import review data is calculated by determining a percent of the auto-filled data fields in the proposed pre-import review data that were changed by the user; thereby determining a percent accuracy score. As a specific illustrative example, if 1% of the auto-filled data fields in the proposed pre-import review data were changed by the user, then the accuracy score for the proposed pre-import review data would be 99%.

In one embodiment, the accuracy score for the proposed pre-import review data is calculated by determining the number of the auto-filled data fields in the proposed pre-import review data that were changed by the user and the total number of the auto-filled data fields in the proposed pre-import review data; thereby determining a raw accuracy score. As a specific illustrative example, if 2 of the auto-filled data fields in the proposed pre-import review data were changed by the user, and the total number of auto-filled data fields in the proposed pre-import review data is 77, then the accuracy score for the proposed pre-import review data would be 2/77.

In one embodiment, the user corrected pre-import review data is then used as the import data for the data management system. In one embodiment one or more reports are also generated indicating the accuracy score for the proposed pre-import review data and are provided to the user.

In one embodiment, the one or more reports generated indicating the accuracy score for the proposed pre-import review data are also provided to the provider of the data management system for use as feedback. In various embodiments, this feedback data can be used to: optimize the OCR system; make the data field recognition process more accurate; identify problematic data fields and data entry fields; identify problematic source documents; and/or otherwise refine and perfect the data importation process and the data management system.

In one embodiment, the cumulative accuracy score for multiple proposed pre-import review data files associated with multiple clients of the user is also calculated and included in the one or more reports provided to the user and/or the provider of the data management system.

Hardware System Architecture

FIG. 1 is a block diagram of an exemplary hardware architecture for implementing one embodiment of a system and method for tracking and reporting data importation accuracy, such as exemplary process 200 (FIG. 2) discussed herein, that, returning to FIG. 1, includes: a user computing system 100, e.g., a computing system accessible by a first party associated with one or more source documents, and/or a user acting on behalf of the first party; a provider computing system 120, e.g., a second computing system associated with a provider of the process for tracking and reporting data importation accuracy and/or a data management system; and a communications link 140.

Figure 1:
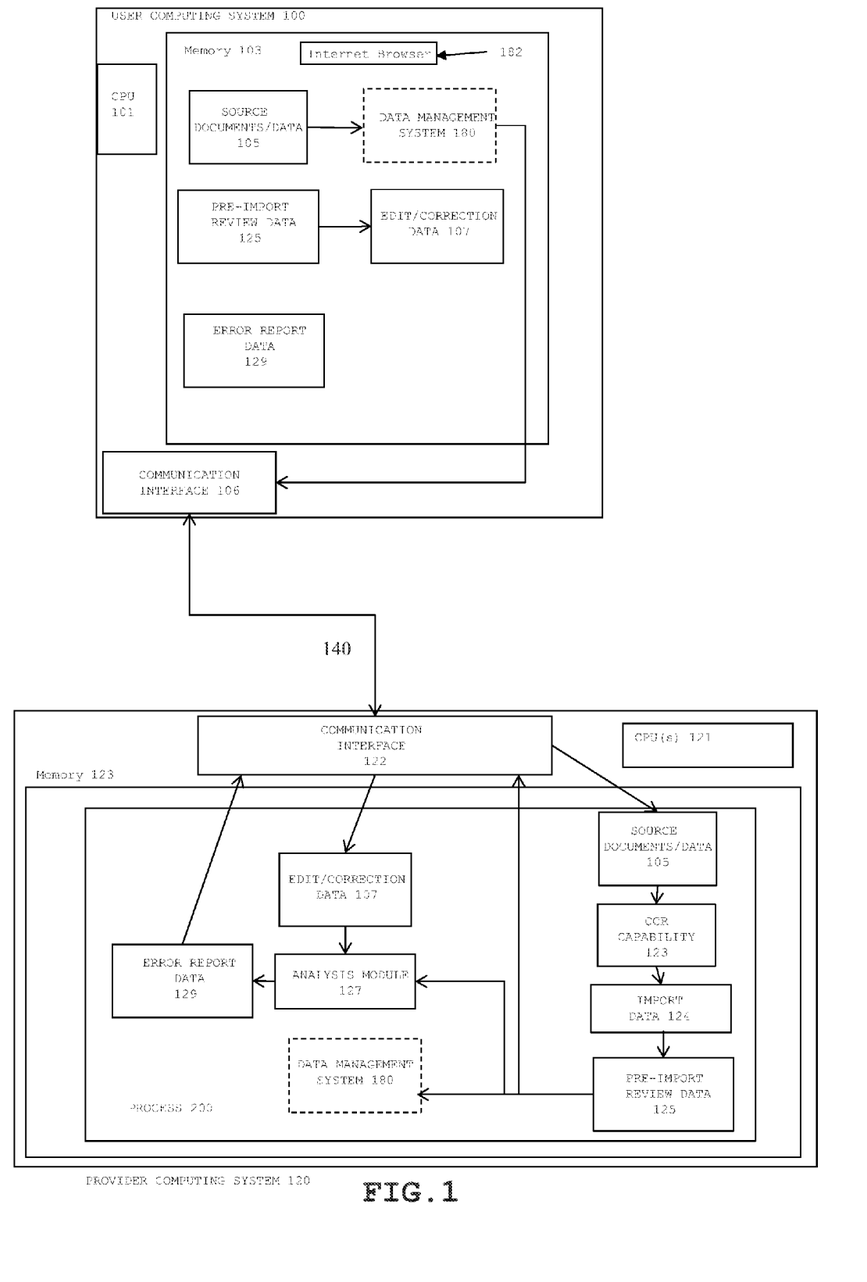
FIG. 1 is a block diagram of an exemplary hardware architecture for implementing one embodiment.

As seen in FIG. 1, user computing system 100 typically includes a central processing unit (CPU) 101, a communication interface 106, and a memory system 103.

In one embodiment, user computing system 100 is any computing system, and/or mobile computing system, as discussed herein, and/or as known/available in the art at the time of filing, and/or as developed/made available after the time of filing.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "mobile computing system" and "mobile device" are used interchangeably and include, but are not limited to: a portable computer; a two-way pager; a cellular telephone; a smart phone; a digital wireless telephone; a tablet computing system; a notebook computing system; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, memory system 103 includes all, or part, of a data management system 180, such as any data management system discussed herein, known in the art at the time of filing, and/or as developed thereafter.

Herein, the term data management system includes, but is not limited to, any on-line, and/or web-based, and/or computing system implemented, package, program, module, or application that processes a user's data and uses, includes, or has access to, a data importation capability. Numerous types of data management systems are currently available, including, but not limited to: on-line, and/or web-based, and/or computing system implemented, tax preparation systems, packages, programs, modules, or applications; on-line, and/or web-based, and/or computing system implemented, business or personal financial management systems, packages, programs, modules, or applications; on-line, and/or web-based, and/or computing system implemented, payroll management systems, packages, programs, modules, or applications; on-line, and/or web-based, and/or computing system implemented, healthcare expense tracking systems, packages, programs, modules, or applications; on-line, and/or web-based, and/or computing system implemented, home or asset inventory systems, packages, programs, modules, or applications; and/or any data processing system as discussed herein, and/or as known/available in the art at the time of filing, and/or as developed/made available after the time of filing.

Herein, a computing system implemented tax preparation system includes, but is not limited to, any on-line, and/or web-based, and/or computing system implemented, tax preparation systems, applications, packages, programs, modules, websites, interfaces, or software systems, as discussed herein, and/or as known in the art at the time of filing, and/or as developed after the time of filing. Specific examples of computing system implemented tax preparation systems include TurboTax™ or Lacerte™, available from Intuit Inc. of Mountain View, Calif.

Herein, a computing system implemented financial management system can be, but is not limited to, any of the following: an on-line, and/or web-based, and/or computing system implemented, personal financial management system, package, program, module, or application; an on-line, and/or web-based, and/or computing system implemented, business financial management system, package, program, module, or application; an on-line, and/or web-based, and/or computing system implemented, business inventory system, package, program, module, or application; an on-line, and/or web-based, and/or computing system implemented business asset management system, package, program, module, or application; an on-line, and/or web-based, and/or computing system implemented, business accounting system, package, program, module, or application; and/or any of the numerous on-line, and/or web-based, and/or computing system implemented, financial management systems discussed herein and/or as known in the art at the time of filing. A specific example of a computing system implemented business financial management system is Quickbooks™, and/or Quicken™, available from Intuit Inc. of Mountain View, Calif., Mint™, available from Intuit Inc. of Mountain View, Calif., Mint Mobile™, available from Intuit Inc. of Mountain View, Calif., Quicken Online™, available from Intuit Inc. of Mountain View, Calif., and/or various other computing system implemented financial management systems discussed herein, and/or known to those of skill in the art at the time of filing, and/or as developed after the time of filing.

Returning to FIG. 1, user computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

In one embodiment, user computing system 100 also includes an Internet browser capability 182 that, in one embodiment, includes a search engine (not shown) and is stored, in whole, or in part in memory 103.

In one embodiment, memory system 103 includes source documents/data 105. In one embodiment, source documents/data 105 is obtained by converting one or more hard-copies of the source documents into digital images of the source documents. In one embodiment, source documents/data 105 is provided to data management system 180. In one embodiment, source documents/data 105 is provided to provider computing system 120 via communication interface 106, communications channel 140, and communication interface 122.

In various embodiments, the type of source documents, and/or source document data, represented by source documents/data 105 is dependent on the type of data management system 180 importing the source documents/data 105 and can include, but is not limited to: tax related documents such as W-2 forms, 1099-B forms, interest or dividend documents, mortgage payment documents, retirement plan related documents, etc.; financial documents such as invoices, checks, bills, bank statements, etc.; ownership documents such as deeds, pink slips, stock certificates, etc.; receipts; medical expense related documents, such a EOBs and healthcare service bills; and/or any other documents, copies of documents, or source document data, that include data or information that the user may desire to import into a data management system, as discussed herein, and/or as known in the art at the time of filing, and/or as developed/made available after the time of filing.

In one embodiment, source documents/data 105 is obtained from a user who is the subject of the source documents, such as a tax payer or business owner.

In one embodiment, source documents/data 105 is obtained from a user who is a representative, or agent, of the party who is the subject of the source documents, such as an accounting professional or a tax preparer whose client is the party who is the subject of the source documents.

In one embodiment, memory system 103 includes pre-import review data 125. As noted above, in one embodiment, source documents/data 105 is provided to provider computing system 120. In one embodiment, source documents/data 105 is processed by an edge/boundary detection system and/or scanned using one or more Optical Character Recognition (OCR) systems, and/or other pattern matching technology, represented by OCR capability 123 in FIG. 1, to identify relevant data fields in the one or more source documents, and/or source document data, and/or relevant import data 124.

In one embodiment, the edge/boundary detection system of OCR capability 123 detects individual data fields in the one or more source documents, and/or source document data of source documents/data 105.

In one embodiment, the one or more OCR systems, and/or pattern matching technology, of OCR capability 123 are used to extract relevant information/images from the data fields of the one or more source documents, and/or source document data, and transform the information/images into import data 124 readable, and usable, by data management system 180 in the same way any other data is processed by data management system 180.

In various embodiments, depending on the data management system 180 involved, the import data 124 can include, but is not limited to: tax related data, such as income, withholdings, 401K or other retirement contributions, dividend income data, interest earned data, interest paid data, etc.; financial data such as transactional data, invoice data, receipt data, expense data, etc.; healthcare expense data, such as EOB data, date of service data, deductible data, co-pay data, etc.; general user information such as Social Security/Tax payer ID number, Employer Identification Number (EIN), work address, home address, telephone number, marital status, etc.; and/or any other import data desired and/or as discussed herein, and/or as known in the art at the time of filing, and/or as developed/made available after the time of filing.

In one embodiment, once import data 124 is identified and extracted from source documents/data 105, import data 124 is used to create proposed pre-import review data 125 that indicates the proposed use of import data 124 to auto-fill one or more data fields in one or more forms associated with data management system 180, and/or any other proposed use of the import data 124 by data management system 180.

In one embodiment, pre-import review data 125 is then provided to user computing system 100 via communication interface 122, communications channel 140, and communication interface 106. In one embodiment, pre-import review data 125 is provided to user computing system 100 for review,
editing, correction, and/or approval by the user prior to the actual importation of the import data to data management system 180.

In one embodiment, if the user makes any edits, corrections, or changes to the pre-import review data 125, the user edits, corrections, or changes are recorded as edit/correction data 107. In one embodiment, edit/correction data 107 indicates the user edits, corrections, or changes to pre-import review data 125, and, in particular, the number and/or type of data entry fields edited or corrected.

In one embodiment, edit/correction data 107 is then sent to provider computing system 120 via communication interface 106, communications channel 140, and communication interface 122.

As seen in FIG. 1, provider computing system 120 typically includes a central processing unit (CPUs) 121, communications interface 122, and a memory system 123.

In one embodiment, memory 123 includes all or part of process for tracking and reporting data importation accuracy 200, shown as process 200 in FIG. 1, and, in one embodiment, data management system 180.

As discussed above, in one embodiment, memory 123 and process for tracking and reporting data importation accuracy 200 includes OCR capability 123, and import data 124. As also discussed above, in one embodiment, memory 123 and process for tracking and reporting data importation accuracy 200 includes pre-import review data 125 and edit/correction data 107 obtained from user computing system 100.

In one embodiment, pre-import review data 125 and edit/correction data 107 are used as input data to analysis module 127. In one embodiment, at analysis module 127 pre-import review data 125 and edit/correction data 107 are analyzed/compared to calculate an accuracy score for pre-import review data 125.

In one embodiment, the accuracy score for pre-import review data 125 is calculated by determining a percent of the auto-filled data fields in pre-import review data 125 that were changed by the user in edit/correction data 107; thereby determining a percent accuracy score. As a specific illustrative example, if 1% of the auto-filled data fields in the pre-import review data 125 were changed by the user in edit/correction data 107, then the accuracy score for the pre-import review data 125 would be 99%.

In one embodiment the accuracy score for pre-import review data 125 is used to generate error report data 129 indicating the accuracy score for pre-import review data 125 and error report data 129 is provided to the user computing system 100 via communication interface 122, communications channel 140, and communication interface 106.

In one embodiment, computing systems 100 and 120 are linked together via communications channel 140. In various embodiments, communications channel 140 can be, but is not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, computing systems 100 and 120 are part of a cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100 and 120 are not relevant.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of computing systems 100 and 120 may be located remotely from their respective system and accessed via communications channel 140.

As discussed in more detail below, in one embodiment, a process for tracking and reporting data importation accuracy, and/or a financial management system, is stored, in whole, or in part, in one or more memory systems, and/or cache memories, associated with one or more computing systems. As used herein, a memory refers to a volatile memory, a non-volatile memory, or any combination of the two.

Although a process for tracking and reporting data importation accuracy, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for tracking and reporting data importation accuracy, and/or a financial management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 121. In one embodiment, execution of a process by CPU 101 or 121 results in the operations of an agent computer process (not shown) and/or a rule computer process (not shown).

In one embodiment, a process for tracking and reporting data importation accuracy, and/or a financial management system, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

Herein, the term "user" and "user consumer" are used interchangeably to denote any party and/or entity that interfaces with, and/or to whom information is provided by, a process for tracking and reporting data importation accuracy, and/or a person and/or entity that interfaces with, and/or to whom information is provided by, a process for tracking and reporting data importation accuracy, and/or a legal guardian of person and/or entity that interfaces with, and/or to whom information is provided by, a process for tracking and reporting data importation accuracy, and/or an authorized agent of any party and/or person and/or entity that interfaces with, and/or to whom information is provided by, a process for tracking and reporting data importation accuracy.

In accordance with one embodiment, a system and method for tracking and reporting data importation accuracy includes a process for tracking and reporting data importation accuracy whereby import data is obtained from one or more source documents, and/or from source document data, and the import data is used to generate proposed pre-import review data indicating the proposed use of the import data to auto-fill one or more data entry fields in one or more forms associated with a data management system.

In one embodiment, the proposed pre-import review data is provided to a user for review, editing, correction, and/or approval. In one embodiment, if the user makes any edits, corrections, or changes to the proposed pre-import review data, the user edits, corrections, or changes are recorded, e.g., any changes to the data entry fields in the proposed pre-import review data are recorded.

In one embodiment, the proposed pre-import review data and the data indicating the user's edits, corrections, or changes to the proposed pre-import review data, are analyzed/compared to calculate an accuracy score for the proposed pre-import review data, e.g., a percent of the auto-filled data fields in the proposed pre-import review data that were changed by the user is determined.

In one embodiment, the user corrected pre-import review data is then used as the import data for the data management system and one or more reports are generated and provided to the user indicating the accuracy score for the proposed pre-import review data.

Figure 2:
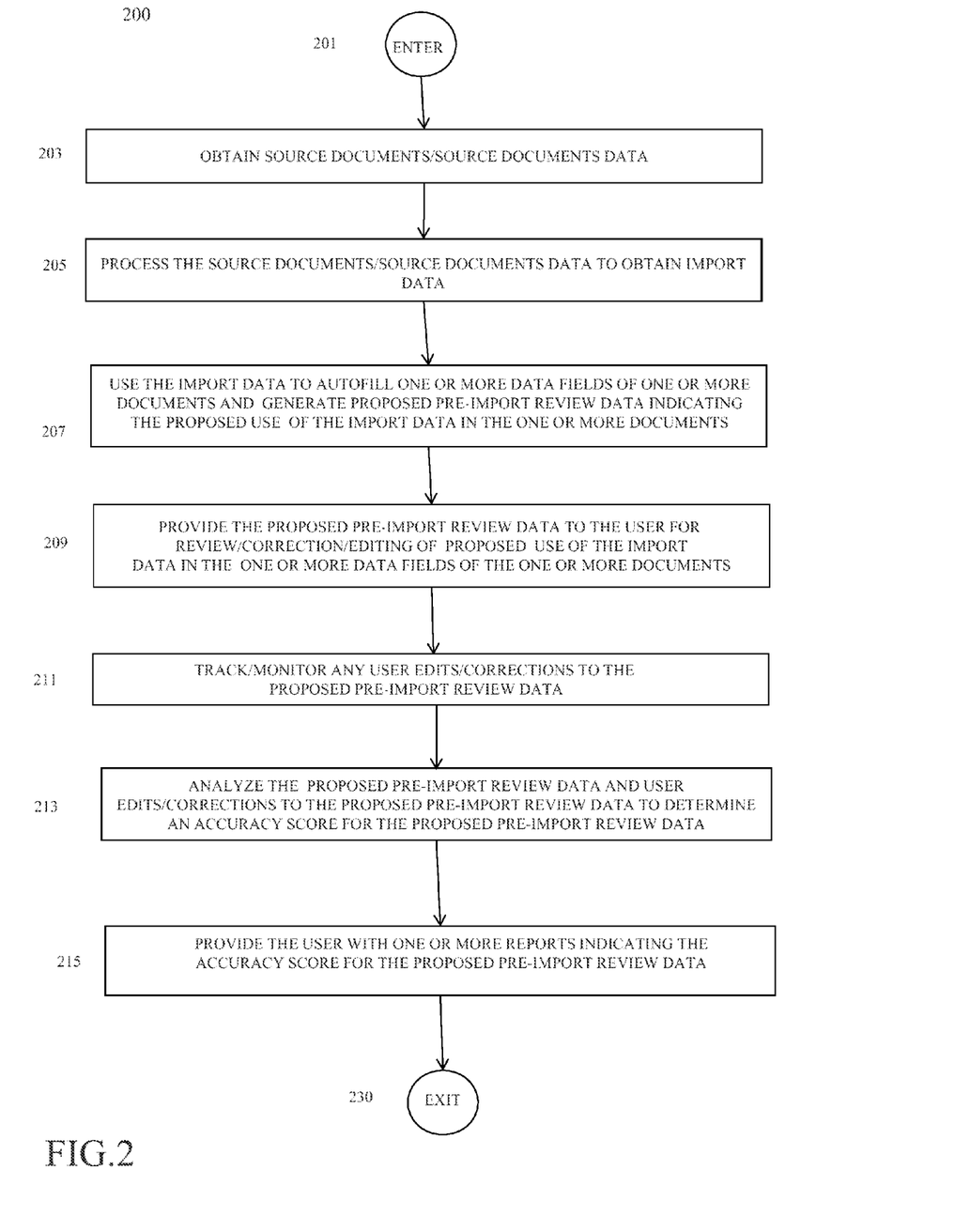
FIG. 2 is a flow chart depicting a process for tracking and reporting data importation accuracy in accordance with one embodiment.

FIG. 2 is a flow chart depicting a process for tracking and reporting data importation accuracy 200 in accordance with one embodiment.

In various embodiments, process for tracking and reporting data importation accuracy 200 is implemented as a feature of a data management system. In various embodiments, process for tracking and reporting data importation accuracy 200 is implemented as an add-on application or module. In various embodiments, process for tracking and reporting data importation accuracy 200 is implemented as a standalone application.

In various embodiments, all, or part of, process for tracking and reporting data importation accuracy 200, and/or a data management system associated with process for tracking and reporting data importation accuracy 200, is/are implemented on one or more computing systems and/or mobile computing systems.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As noted above, as used herein, the terms "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communications networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

As seen in FIG. 2, process for tracking and reporting data importation accuracy 200 begins at ENTER OPERATION 201 of FIG. 2 and process flow proceeds to OBTAIN SOURCE DOCUMENTS/SOURCE DOCUMENTS DATA OPERATION 203.

In one embodiment, at OBTAIN SOURCE DOCUMENTS/SOURCE DOCUMENTS DATA OPERATION 203 one or more source documents, and/or source document data, are obtained by process for tracking and reporting data importation accuracy 200, and/or one or more data management systems associated with process for tracking and reporting data importation accuracy 200.

In various embodiments, the one or more source documents obtained at OBTAIN SOURCE DOCUMENTS/SOURCE DOCUMENTS DATA OPERATION 203 are hard-copy original source documents or copies of the source documents.

In various embodiments, at OBTAIN SOURCE DOCUMENTS/SOURCE DOCUMENTS DATA OPERATION 203 the one or more source documents are scanned and transformed into source document data that includes digital images of the original source documents or digital images of copies of the source documents.

In various embodiments, the type of source documents, and/or source document data, obtained at OBTAIN SOURCE DOCUMENTS/SOURCE DOCUMENTS DATA OPERATION 203 is dependent on the data management system importing the data and can include, but is not limited to: tax related documents such as W-2 forms, 1099-B forms, interest or dividend documents, mortgage payment documents, retirement plan related documents, etc.; financial documents such as invoices, checks, bills, bank statements, etc.; ownership documents such as deeds, pink slips, stock certificates, etc.; receipts; medical expense related documents, such a EOBs and healthcare service bills; and/or any other documents, copies of documents, or source document data, that include data or information that the user may desire to import into a data management system, as discussed herein, and/or as known in the art at the time of filing, and/or as developed/made available after the time of filing.

In one embodiment, the one or more source documents, and/or source document data, are obtained at OBTAIN SOURCE DOCUMENTS/SOURCE DOCUMENTS DATA OPERATION 203 from a user who is the subject of the source documents, such as a tax payer or business owner.

In one embodiment, the one or more source documents, and/or source document data, are obtained at OBTAIN SOURCE DOCUMENTS/SOURCE DOCUMENTS DATA OPERATION 203 from a user who is a representative, or agent, of the party who is the subject of the source documents, such as an accounting professional or a tax preparer whose client is the party who is the subject of the source documents.

In one embodiment, the user providing the one or more source documents, and/or source document data, at OBTAIN SOURCE DOCUMENTS/SOURCE DOCUMENTS DATA OPERATION 203 is a user of a data management system associated with process for tracking and reporting data importation accuracy 200.

Herein, the term data management system includes, but is not limited to, any on-line, and/or web-based, and/or computing system implemented, package, program, module, or application that processes a user's data and uses, includes, or has access to, a data importation capability. Numerous types of data management systems are currently available, including, but not limited to: on-line, and/or web-based, and/or computing system implemented, tax preparation systems, packages, programs, modules, or applications; on-line, and/or web-based, and/or computing system implemented, business or personal financial management systems, packages, programs, modules, or applications; on-line, and/or web-based, and/or computing system implemented, payroll management systems, packages, programs, modules, or applications; on-line, and/or web-based, and/or computing system implemented, healthcare expense tracking systems, packages, programs, modules, or applications; on-line, and/or web-based, and/or computing system implemented, home or asset inventory systems, packages, programs, modules, or applications; and/or any data processing system as discussed herein, and/or as known/available in the art at the time of filing, and/or as developed/made available after the time of filing.

Herein, a computing system implemented tax preparation system includes, but is not limited to, any on-line, and/or web-based, and/or computing system implemented, tax preparation systems, applications, packages, programs, modules, websites, interfaces, or software systems, as discussed herein, and/or as known in the art at the time of filing, and/or as developed after the time of filing. Specific examples of computing system implemented tax preparation systems include TurboTax™ or Lacerte™, available from Intuit Inc. of Mountain View, Calif.

Herein, a computing system implemented financial management system can be, but is not limited to, any of the following: an on-line, and/or web-based, and/or computing system implemented, personal financial management system, package, program, module, or application; an on-line, and/or web-based, and/or computing system implemented, business financial management system, package, program, module, or application; an on-line, and/or web-based, and/or computing system implemented, business inventory system, package, program, module, or application; an on-line, and/or web-based, and/or computing system implemented business asset management system, package, program, module, or application; an on-line, and/or web-based, and/or computing system implemented, business accounting system, package, program, module, or application; and/or any of the numerous on-line, and/or web-based, and/or computing system implemented, financial management systems discussed herein and/or as known in the art at the time of filing. A specific example of a computing system implemented business financial management system is Quickbooks™, and/or Quicken™, available from Intuit Inc. of Mountain View, Calif., Mint™, available from Intuit Inc. of Mountain View, Calif., Mint Mobile™, available from Intuit Inc. of Mountain View, Calif., Quicken Online™, available from Intuit Inc. of Mountain View, Calif., and/or various other computing system implemented financial management systems discussed herein, and/or known to those of skill in the art at the time of filing, and/or as developed after the time of filing.

In one embodiment, once one or more source documents, and/or source document data, are obtained by process for tracking and reporting data importation accuracy 200 and/or one or more data management systems associated with process for tracking and reporting data importation accuracy 200 at OBTAIN SOURCE DOCUMENTS/SOURCE DOCUMENTS DATA OPERATION 203, process flow proceeds to PROCESS THE SOURCE DOCUMENTS/SOURCE DOCUMENTS DATA TO OBTAIN IMPORT DATA OPERATION 205.

In one embodiment, at PROCESS THE SOURCE DOCUMENTS/SOURCE DOCUMENTS DATA TO OBTAIN IMPORT DATA OPERATION 205 the one or more source documents, and/or source document data, obtained from the user at OBTAIN SOURCE DOCUMENTS/SOURCE DOCUMENTS DATA OPERATION 203 are processed to identify and obtain import data to be used with, and/or processed by, the data management system.

In one embodiment, at PROCESS THE SOURCE DOCUMENTS/SOURCE DOCUMENTS DATA TO OBTAIN IMPORT DATA OPERATION 205 the one or more source documents, and/or source document data, obtained from the user are processed by an edge/boundary detection system and/or scanned using one or more OCR systems, and/or other pattern matching technology, to identify relevant data fields in the one or more source documents, and/or source document data, and/or relevant import data.

In one embodiment, at PROCESS THE SOURCE DOCUMENTS/SOURCE DOCUMENTS DATA TO OBTAIN IMPORT DATA OPERATION 205 the edge/boundary detection system detects individual data fields in the one or more source documents, and/or source document data.

In one embodiment, at PROCESS THE SOURCE DOCUMENTS/SOURCE DOCUMENTS DATA TO OBTAIN IMPORT DATA OPERATION 205 the one or more OCR systems, and/or pattern matching technology, are used to extract relevant information/images from the data fields of the one or more source documents, and/or source document data, and transform the information/images into electronic import data readable, and usable, by the data management system in the same way any other data is processed by the data management system.

In various embodiments, depending on the data management system involved, the import data of at PROCESS THE SOURCE DOCUMENTS/SOURCE DOCUMENTS DATA TO OBTAIN IMPORT DATA OPERATION 205 can include, but is not limited to: tax related data, such as income, withholdings, 401K or other retirement contributions, dividend income data, interest earned data, interest paid data, etc.; financial data such as transactional data, invoice data, receipt data, expense data, etc.; healthcare expense data, such as EOB data, date of service data, deductible data, co-pay data, etc.; general user information such as Social Security/Tax payer ID number, Employer Identification Number (EIN), work address, home address, telephone number, marital status, etc.; and/or any other import data desired and/or as discussed herein, and/or as known in the art at the time of filing, and/or as developed/made available after the time of filing.

In one embodiment, once the one or more source documents, and/or source document data, obtained from the user at OBTAIN SOURCE DOCUMENTS/SOURCE DOCUMENTS DATA OPERATION 203 are processed to identify and obtain import data to be used with, and/or processed by, the data management system at PROCESS THE SOURCE DOCUMENTS/SOURCE DOCUMENTS DATA TO OBTAIN IMPORT DATA OPERATION 205, process flow proceeds to USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207.

In one embodiment, at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data of PROCESS THE SOURCE DOCUMENTS/SOURCE DOCUMENTS DATA TO OBTAIN IMPORT DATA OPERATION 205 is used to create proposed pre-import review data, and/or a proposed pre-import review data file, that indicates the proposed use of the import data to auto-fill one or more data fields in one or more forms associated with the data management system, and/or any other proposed use of the import data by the data management system.

In one embodiment, the one or more forms proposed to utilize the import data and the proposed data fields auto-filled with the import data in the proposed pre-import review data file of USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 are selected based on the data management system being used.

As a specific illustrative example, if the data management system being used is a tax preparation system, then at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data can be used to auto-fill various data fields in a tax questionnaire interface or in one or more tax forms such as a 1040 tax filing form.

As another specific example, if the data management system being used is an accounting system, then at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data can be used to auto-fill various data fields of accounting report calculation forms/reports such as P&L reports or quarterly status reports.

As another specific example, if the data management system being used is a financial management system, then at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data can be used to auto-fill various data fields of various financial status calculation forms/reports such as expense reports, categorized spending reports, savings reports, net worth reports, or projected expenses.

As another specific example, if the data management system being used is a healthcare expense tracking system, then at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data can be used to auto-fill various data fields of forms/reports used to calculate total out-of-pocket costs, projected costs, or the status of healthcare insurance payments.

In various embodiments, at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data can be used with numerous other forms, and/or to prepare numerous other reports, as dictated by the data management system being used. In addition, in various embodiments, the import data can be used by multiple different data management systems and data management system forms.

In one embodiment, once the import data of PROCESS THE SOURCE DOCUMENTS/SOURCE DOCUMENTS DATA TO OBTAIN IMPORT DATA OPERATION 205 is used to create proposed pre-import review data, and/or a proposed pre-import review data file, that indicates the proposed use of the import data to auto-fill one or more data fields in one or more forms associated with the data management system, and/or any other proposed use of the import data by the data management system, at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207, process flow proceeds to PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209.

In one embodiment, at PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 the proposed pre-import review data of USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 is provided to the user for review, editing, correction, and/or approval prior to the actual importation of the import data to the data management system.

In one embodiment, once the proposed pre-import review data of USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 is provided to the user for review, editing, correction, and/or approval prior to the actual importation of the import data to the data management system at PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209, process flow proceeds to TRACK/MONITOR ANY USER EDITS/CORRECTIONS TO THE PROPOSED PRE-IMPORT REVIEW DATA OPERATION 211.

In one embodiment, at TRACK/MONITOR ANY USER EDITS/CORRECTIONS TO THE PROPOSED PRE-IMPORT REVIEW DATA OPERATION 211 any edits, corrections, or other changes the user makes to the proposed pre-import review data of PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 are recorded.

In one embodiment, at TRACK/MONITOR ANY USER EDITS/CORRECTIONS TO THE PROPOSED PRE-IMPORT REVIEW DATA OPERATION 211 data indicating the user edits, corrections, or changes to proposed pre-import review data, and, in particular, the number and/or type of data entry fields edited, corrected, or changed is recorded.

In one embodiment, at TRACK/MONITOR ANY USER EDITS/CORRECTIONS TO THE PROPOSED PRE-IMPORT REVIEW DATA OPERATION 211 the user edits, corrections, or changes to the proposed pre-import review data results in user corrected pre-import review data.

In one embodiment, once any edits, corrections, or other changes the user makes to the proposed pre-import review data of PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 are recorded at TRACK/MONITOR ANY USER EDITS/CORRECTIONS TO THE PROPOSED PRE-IMPORT REVIEW DATA OPERATION 211, process flow proceeds to ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213.

In one embodiment, at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 the proposed pre-import review data of PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 and the data indicating the user edits, corrections, or changes to proposed pre-import review data, and/or the user corrected pre-import review data, of TRACK/MONITOR ANY USER EDITS/CORRECTIONS TO THE PROPOSED PRE-IMPORT REVIEW DATA OPERATION 211 are analyzed/compared to calculate an accuracy score for the proposed pre-import review data of PROVIDE THE PROPOSED PRE-IMPORT REVIEW DATA TO THE USER FOR REVIEW/CORRECTION/EDITING OF THE PROPOSED USE OF THE IMPORT DATA

IN THE ONE OR MORE DATA FIELDS OF THE ONE OR MORE DOCUMENTS OPERATION 209.

In one embodiment, at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 the proposed pre-import review data and data indicating the user edits, corrections, or changes to proposed pre-import review data are analyzed/compared and transformed into an accuracy score for the proposed pre-import review data using one or more processors associated with one or more computing systems.

In one embodiment, at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 the proposed pre-import review data and the user corrected pre-import review data are analyzed/compared and transformed into an accuracy score for the proposed pre-import review data using one or more processors associated with one or more computing systems.

In one embodiment, the accuracy score for the proposed pre-import review data is calculated at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 by determining a percent of the auto-filled data fields in the proposed pre-import review data that were changed by the user; thereby determining a percent accuracy score. As a specific illustrative example, if 1% of the auto-filled data fields in the proposed pre-import review data were changed by the user, then the accuracy score for the proposed pre-import review data would be 99%.

In one embodiment, the accuracy score for the proposed pre-import review data is calculated at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 by determining the number of the auto-filled data fields in the proposed pre-import review data that were changed by the user and the total number of the auto-filled data fields in the proposed pre-import review data; thereby determining a raw accuracy score. As a specific illustrative example, if 2 of the auto-filled data fields in the proposed pre-import review data were changed by the user, and the total number of auto-filled data fields in the proposed pre-import review data is 77, then the accuracy score for the proposed pre-import review data would be 2/77.

In one embodiment, once the proposed pre-import review data of PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 and the data indicating the user edits, corrections, or changes to proposed pre-import review data, and/or the user corrected pre-import review data, of TRACK/MONITOR ANY USER EDITS/CORRECTIONS TO THE PROPOSED PRE-IMPORT REVIEW DATA OPERATION 211 are analyzed/compared to calculate an accuracy score for the proposed pre-import review data of PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213, process flow proceeds to PROVIDE THE USER WITH ONE OR MORE REPORTS INDICATING THE ACCURACY SCORE FOR THE PROPOSED PRE-IMPORT REVIEW DATA OPERATION 215.

In one embodiment, at PROVIDE THE USER WITH ONE OR MORE REPORTS INDICATING THE ACCURACY SCORE FOR THE PROPOSED PRE-IMPORT REVIEW DATA OPERATION 215 the user corrected pre-import review data is used as the import data for the data management system and one or more reports are generated indicating the accuracy score for the proposed pre-import review data of ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 and the accuracy score reports are provided to the user.

In one embodiment, at PROVIDE THE USER WITH ONE OR MORE REPORTS INDICATING THE ACCURACY SCORE FOR THE PROPOSED PRE-IMPORT REVIEW DATA OPERATION 215 the user corrected pre-import review data of TRACK/MONITOR ANY USER EDITS/CORRECTIONS TO THE PROPOSED PRE-IMPORT REVIEW DATA OPERATION 211 is used as the import data for the data management system.

In one embodiment, the one or more reports generated at PROVIDE THE USER WITH ONE OR MORE REPORTS INDICATING THE ACCURACY SCORE FOR THE PROPOSED PRE-IMPORT REVIEW DATA OPERATION 215 indicating the accuracy score for the proposed pre-import review data are provided to the user.

In one embodiment, the one or more reports generated at PROVIDE THE USER WITH ONE OR MORE REPORTS INDICATING THE ACCURACY SCORE FOR THE PROPOSED PRE-IMPORT REVIEW DATA OPERATION 215 indicating the accuracy score for the proposed pre-import review data are also provided to the provider of the data management system for use as feedback.

In various embodiments, the feedback data provided to the provider of the data management system at PROVIDE THE USER WITH ONE OR MORE REPORTS INDICATING THE ACCURACY SCORE FOR THE PROPOSED PRE-IMPORT REVIEW DATA OPERATION 215 can be used to: optimize the OCR system; make the data field recognition process more accurate; identify problematic data fields and data entry fields; identify problematic source documents; and/or otherwise refine and perfect the data importation process and the data management system.

In one embodiment, the cumulative accuracy score for multiple proposed pre-import review data files associated with multiple clients of the user is also calculated and included in the one or more reports provided to the user, and/or the provider of the data management system.

As a specific illustrative example of the implementation of one embodiment, assume the data management system is a tax preparation system used by a user who is a tax preparation professional preparing a tax return for a tax payer client, i.e., a first party client associated with the source documents.

In this specific illustrative example, assume the tax payer provides the tax preparation professional user various tax related source documents, such as W-2 forms, 1099-B forms, interest or dividend documents, mortgage payment documents, retirement plan related documents, etc., and the tax preparation professional user scans the tax related source documents to create tax related source document data.

In this specific illustrative example, at OBTAIN SOURCE DOCUMENTS/SOURCE DOCUMENTS DATA OPERATION 203 the tax preparation professional user submits the tax related source document data to an import function associated with a tax preparation system such as Lacerte™ or TurboTax™ ProSeries.

In this specific illustrative example, at PROCESS THE SOURCE DOCUMENTS/SOURCE DOCUMENTS DATA TO OBTAIN IMPORT DATA OPERATION 205 the tax related source document data is processed using OCR software in partnership with a third party, such as EMC™ and import data, such as income, withholdings, 401K or other retirement contributions, dividend income data, interest earned data, interest paid data, etc., is identified and extracted.

In this specific illustrative example, at USE THE IMPORT DATA TO AUTO-FILL ONE OR MORE DATA FIELDS OF ONE OR MORE DOCUMENTS AND GENERATE PROPOSED PRE-IMPORT REVIEW DATA INDICATING THE PROPOSED USE OF THE IMPORT DATA IN THE ONE OR MORE DOCUMENTS OPERATION 207 the import data is used to create proposed pre-import review data, and/or a proposed pre-import review data file, that indicates the proposed use of the import data by the tax preparation system, e.g., the proposed import data and it's proposed use.

In this specific illustrative example, at PROVIDE THE PROPOSED PRE-IMPORT REVIEW DATA TO THE USER FOR REVIEW/CORRECTION/EDITING OF THE PROPOSED USE OF THE IMPORT DATA IN THE ONE OR MORE DATA FIELDS OF THE ONE OR MORE DOCUMENTS OPERATION 209 an xml file with the appropriately mapped data to be imported into the tax software, and a highlighted PDF file showing which data from the source documents is tagged for import is provided to the tax preparation professional user. The tax preparation professional user is then notified the pre-import review data file is ready to import.

In this specific illustrative example, at TRACK/MONITOR ANY USER EDITS/CORRECTIONS TO THE PROPOSED PRE-IMPORT REVIEW DATA OPERATION 211 the tax preparation professional user launches a Pre-import Review tool that shows all the fields that are to be imported, and lets the tax preparation professional user edit, correct, and/or change any data entry field values that might be in error.

In this specific illustrative example, at TRACK/MONITOR ANY USER EDITS/CORRECTIONS TO THE PROPOSED PRE-IMPORT REVIEW DATA OPERATION 211 all the tax preparation professional user edits, corrections, and/or changes are recorded and, at the end of the review, the tax preparation professional user executes an "Import" command and the tax preparation professional user corrected/approved pre-import review data is imported to the tax preparation system for processing.

In this specific illustrative example, at ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 the proposed pre-import review data and data indicating the tax preparation professional user edits, corrections, or changes to proposed pre-import review data are analyzed/compared and transformed into an accuracy score for the proposed pre-import review data.

In one embodiment, at PROVIDE THE USER WITH ONE OR MORE REPORTS INDICATING THE ACCURACY SCORE FOR THE PROPOSED PRE-IMPORT REVIEW DATA OPERATION 215, the tax preparation professional user is provided with one or more reports indicating how many total fields were processed and how many of those fields were edited by the tax preparation professional user, and the resulting accuracy rate.

In one embodiment, the cumulative accuracy score for multiple proposed pre-import review data files associated with multiple clients of the tax preparation professional user is also calculated and included in the one or more reports provided to the tax preparation professional user.

In one embodiment, once the user corrected pre-import review data is used as the import data for the data management system and one or more reports are generated indicating the accuracy score for the proposed pre-import review data of ANALYZE THE PROPOSED PRE-IMPORT REVIEW DATA AND USER EDITS/CORRECTIONS TO THE PROPOSED PRE-IMPORT REVIEW DATA TO DETERMINE AN ACCURACY SCORE FOR THE PROPOSED PRE-IMPORT REVIEW DATA OPERATION 213 and the accuracy score reports are provided to the user, and/or the provider of process for tracking and reporting data importation accuracy 200, at PROVIDE THE USER WITH ONE OR MORE REPORTS INDICATING THE ACCURACY SCORE FOR THE PROPOSED PRE-IMPORT REVIEW DATA OPERATION 215, process flow proceeds to EXIT OPERATION 230.

In one embodiment, at EXIT OPERATION 230 process for tracking and reporting data importation accuracy 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for tracking and reporting data importation accuracy 200, a specific user of a data management system, and/or a provider of the data management system, is provided an empirically-based indication of the accuracy of a given data importation event and how well the data management system is actually working for the specific user of the data management system. Consequently, using process for tracking and reporting data importation accuracy 200, a user of a data management system is given a more realistic, and unbiased, indication and perception of the accuracy and utility of the data management system and insight into the data importation process, thereby removing some of the mystery users currently experience with respect to data importation and data management system operation. In addition, process for tracking and reporting data importation accuracy 200 provides data management system providers the opportunity to collect empirical performance data and feedback regarding the data management system.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for tracking and reporting data importation accuracy comprising:
   obtaining one or more source documents;
   processing the one or more source documents to obtain import data from the one or more source documents;
   using the import data to generate pre-import review data, the pre-import review data including one or more data entry fields auto-filled with at least part of the import data from the one or more source documents;
   providing a user with the pre-import review data for user review, editing, correction, and/or approval;
   monitoring the user's edits, corrections, or changes to any of the one or more data entry fields auto-filled with at least part of the import data and recording any user edits, corrections, or changes to the pre-import review data as user edit/correction data;
   analyzing the pre-import review data and the user edit/correction data to determine an accuracy score for the pre-import review data;
   importing the pre-import review data as reviewed, edited, corrected, and/or approved by the user to a data management system; and
   providing the accuracy score for the pre-import review data to the user.

2. The method for tracking and reporting data importation accuracy of claim 1, wherein;
   the one or more source documents are processed to obtain import data using an Optical Character Recognition system.

3. The method for tracking and reporting data importation accuracy of claim 1, wherein;

analyzing the pre-import review data and the user edit/correction data to determine an accuracy score for the pre-import review data includes determining the number of data entry fields of the pre-import review data that were edited, corrected, or changed by the user and the total number of data entry fields of the pre-import review data and calculating the accuracy score for the pre-import review data as the percentage of the data entry fields of the pre-import review data that were not edited, corrected, or changed by the user.

4. The method for tracking and reporting data importation accuracy of claim 1, wherein;
analyzing the pre-import review data and the user edit/correction data to determine an accuracy score for the pre-import review data includes determining the number of data entry fields of the pre-import review data that were edited, corrected, or changed by the user and the total number of data entry fields of the pre-import review data and calculating the accuracy score for the pre-import review data as the ratio of the number data entry fields of the pre-import review data that were edited, corrected, or changed by the user and the total number of data entry fields of the pre-import review data.

5. The method for tracking and reporting data importation accuracy of claim 1, wherein;
the data management system is a data management system selected from the group of data management systems consisting of:
a business financial management system;
a personal financial management system;
a payroll management system;
a business accounting system;
a personal accounting system;
a receipt management system;
a docketing system;
a healthcare expense tracking system;
a home inventory system; or
a business inventory system.

6. The method for tracking and reporting data importation accuracy of claim 1, further comprising:
providing the accuracy score for the pre-import review data to a provider of the data management system.

7. The method for tracking and reporting data importation accuracy of claim 1, further comprising:
providing a cumulative accuracy score for two or more pre-import review data files to the user.

8. The method for tracking and reporting data importation accuracy of claim 1, further comprising:
providing a cumulative accuracy score for two or more pre-import review data files to a provider of the data management system.

9. A method for tracking and reporting data importation accuracy to a tax preparation system comprising:
obtaining one or more source tax documents;
processing the one or more source tax documents to obtain tax import data from the one or more source tax documents;
using the tax import data to generate pre-import review data, the pre-import review data including one or more tax form data entry fields auto-filled with at least part of the tax import data from the one or more source tax documents;
providing a tax preparation user with the pre-import review data for user review, editing, correction, and/or approval;
monitoring the tax preparation user's edits, corrections, or changes to any of the one or more tax form data entry fields auto-filled with at least part of the tax import data and recording any tax preparation user edits, corrections, or changes to the pre-import review data as user edit/correction data;
analyzing the pre-import review data and the tax preparation user edit/correction data to determine an accuracy score for the pre-import review data;
importing the pre-import review data as reviewed, edited, corrected, and/or approved by the tax preparation user to a tax preparation system; and
providing the accuracy score for the pre-import review data to the tax preparation user.

10. The method for tracking and reporting data importation accuracy to a tax preparation system of claim 9, wherein;
the one or more source tax documents are processed to obtain tax import data using an Optical Character Recognition system.

11. The method for tracking and reporting data importation accuracy to a tax preparation system of claim 9, wherein;
analyzing the pre-import review data and the user edit/correction data to determine an accuracy score for the pre-import review data includes determining the number of tax form data entry fields of the pre-import review data that were edited, corrected, or changed by the tax preparation user and the total number of tax form data entry fields of the pre-import review data and calculating the accuracy score for the pre-import review data as the percentage of the tax form data entry fields of the pre-import review data that were not edited, corrected, or changed by the tax preparation user.

12. The method for tracking and reporting data importation accuracy to a tax preparation system of claim 9, wherein;
analyzing the pre-import review data and the user edit/correction data to determine an accuracy score for the pre-import review data includes determining the number of tax form data entry fields of the pre-import review data that were edited, corrected, or changed by the tax preparation user and the total number of tax form data entry fields of the pre-import review data and calculating the accuracy score for the pre-import review data as the ratio of the number tax form data entry fields of the pre-import review data that were edited, corrected, or changed by the tax preparation user and the total number of tax form data entry fields of the pre-import review data.

13. The method for tracking and reporting data importation accuracy to a tax preparation system of claim 9, further comprising:
providing the accuracy score for the pre-import review data to a provider of the tax preparation system.

14. The method for tracking and reporting data importation accuracy to a tax preparation system of claim 9, further comprising:
providing a cumulative accuracy score for two or more pre-import review data files associated with two or more clients of the tax preparation user to the tax preparation user.

15. The method for tracking and reporting data importation accuracy to a tax preparation system of claim 9, further comprising:
providing a cumulative accuracy score for two or more pre-import review data files associated with two or more clients of the tax preparation user to a provider of the tax preparation system.

16. A system for tracking and reporting data importation accuracy comprising:

a user computing system, the user computing system being associated with a user;
one or more source documents
an Optical Character Recognition (OCR) system;
a data management system; and
one or more processors associated with one or more computing systems, the one or more processors associated with one or more computing systems implementing at least part of a process for tracking and reporting data importation accuracy, the process for tracking and reporting data importation accuracy including:
using the one or more processors associated with one or more computing systems to process the one or more source documents using the OCR system to obtain import data from the one or more source documents;
using the one or more processors associated with one or more computing systems and the import data to generate pre-import review data, the pre-import review data including one or more data entry fields auto-filled with at least part of the import data from the one or more source documents;
using the one or more processors associated with one or more computing systems to provide the user computing system with the pre-import review data for user review, editing, correction, and/or approval;
using the one or more processors associated with one or more computing systems to monitor the user's edits, corrections, or changes to any of the one or more data entry fields auto-filled with at least part of the import data and recording any user edits, corrections, or changes to the pre-import review data as user edit/correction data;
using the one or more processors associated with one or more computing systems to analyze the pre-import review data and the user edit/correction data to determine an accuracy score for the pre-import review data;
using the one or more processors associated with one or more computing systems to import the pre-import review data as reviewed, edited, corrected, and/or approved by the user to the data management system; and
using the one or more processors associated with one or more computing systems to provide the accuracy score for the pre-import review data to the user computing system.

17. The system for tracking and reporting data importation accuracy of claim 16, wherein;
analyzing the pre-import review data and the user edit/correction data to determine an accuracy score for the pre-import review data includes determining the number of data entry fields of the pre-import review data that were edited, corrected, or changed by the user and the total number of data entry fields of the pre-import review data and calculating the accuracy score for the pre-import review data as the percentage of the data entry fields of the pre-import review data that were not edited, corrected, or changed by the user.

18. The system for tracking and reporting data importation accuracy of claim 16, wherein;
analyzing the pre-import review data and the user edit/correction data to determine an accuracy score for the pre-import review data includes determining the number of data entry fields of the pre-import review data that were edited, corrected, or changed by the user and the total number of data entry fields of the pre-import review data and calculating the accuracy score for the pre-import review data as the ratio of the number data entry fields of the pre-import review data that were edited, corrected, or changed by the user and the total number of data entry fields of the pre-import review data.

19. The system for tracking and reporting data importation accuracy of claim 16, wherein;
the data management system is a data management system selected from the group of data management systems consisting of:
a business financial management system;
a personal financial management system;
a payroll management system;
a business accounting system;
a personal accounting system;
a receipt management system;
a docketing system;
a healthcare expense tracking system;
a home inventory system; or
a business inventory system.

20. The system for tracking and reporting data importation accuracy of claim 16, further comprising:
providing the accuracy score for the pre-import review data to a provider of the data management system.

21. The system for tracking and reporting data importation accuracy of claim 16, further comprising:
providing a cumulative accuracy score for two or more pre-import review data files to the user computing system.

22. The system for tracking and reporting data importation accuracy of claim 16, further comprising:
providing a cumulative accuracy score for two or more pre-import review data files to a provider of the data management system.

23. A system for tracking and reporting data importation accuracy to a tax preparation system comprising:
a tax preparation user computing system, the tax preparation user computing system being associated with a tax preparation user;
one or more source tax documents
an Optical Character Recognition (OCR) system;
a tax preparation system; and
one or more processors associated with one or more computing systems, the one or more processors associated with one or more computing systems implementing at least part of a process for tracking and reporting data importation accuracy to a tax preparation system, the process for tracking and reporting data importation accuracy to a tax preparation system including:
using the one or more processors associated with one or more computing systems to process the one or more source tax documents to obtain tax import data from the one or more source tax documents;
using the one or more processors associated with one or more computing systems and the tax import data to generate pre-import review data, the pre-import review data including one or more tax form data entry fields auto-filled with at least part of the tax import data from the one or more source tax documents;
using the one or more processors associated with one or more computing systems to provide a tax preparation user with the pre-import review data for user review, editing, correction, and/or approval;
using the one or more processors associated with one or more computing systems to monitor the tax preparation user's edits, corrections, or changes to any of the one or more tax form data entry fields auto-filled with at least part of the tax import data and recording any tax preparation user edits, corrections, or changes to the pre-import review data as user edit/correction data;

using the one or more processors associated with one or more computing systems to analyze the pre-import review data and the tax preparation user edit/correction data to determine an accuracy score for the pre-import review data;

using the one or more processors associated with one or more computing systems to import the pre-import review data as reviewed, edited, corrected, and/or approved by the tax preparation user to a tax preparation system; and using the one or more processors associated with one or more computing systems to provide the accuracy score for the pre-import review data to the tax preparation user.

24. The system for tracking and reporting data importation accuracy to a tax preparation system of claim 23, wherein;

the one or more source tax documents are processed to obtain tax import data using an Optical Character Recognition system.

25. The system for tracking and reporting data importation accuracy to a tax preparation system of claim 23, wherein;

analyzing the pre-import review data and the user edit/correction data to determine an accuracy score for the pre-import review data includes determining the number of tax form data entry fields of the pre-import review data that were edited, corrected, or changed by the tax preparation user and the total number of tax form data entry fields of the pre-import review data and calculating the accuracy score for the pre-import review data as the percentage of the tax form data entry fields of the pre-import review data that were not edited, corrected, or changed by the tax preparation user.

26. The system for tracking and reporting data importation accuracy to a tax preparation system of claim 23, wherein;

analyzing the pre-import review data and the user edit/correction data to determine an accuracy score for the pre-import review data includes determining the number of tax form data entry fields of the pre-import review data that were edited, corrected, or changed by the tax preparation user and the total number of tax form data entry fields of the pre-import review data and calculating the accuracy score for the pre-import review data as the ratio of the number tax form data entry fields of the pre-import review data that were edited, corrected, or changed by the tax preparation user and the total number of tax form data entry fields of the pre-import review data.

27. The system for tracking and reporting data importation accuracy to a tax preparation system of claim 23, further comprising:

providing the accuracy score for the pre-import review data to a provider of the tax preparation system.

28. The system for tracking and reporting data importation accuracy to a tax preparation system of claim 23, further comprising:

providing a cumulative accuracy score for two or more pre-import review data files associated with two or more clients of the tax preparation user to the tax preparation user.

29. The system for tracking and reporting data importation accuracy to a tax preparation system of claim 23, further comprising:

providing a cumulative accuracy score for two or more pre-import review data files associated with two or more clients of the tax preparation user to a provider of the tax preparation system.

* * * * *